(12) United States Patent
Lee et al.

(10) Patent No.: US 6,404,934 B1
(45) Date of Patent: Jun. 11, 2002

(54) HIGH SPEED IMAGE PROCESSING APPARATUS USING A CASCADE OF ELONGATED FILTERS PROGRAMMED IN A COMPUTER

(75) Inventors: Shih-Jong J. Lee, 15418 SE. 53rd Pl., Bellevue, WA (US) 98006; Seho Oh, Mukilteo, WA (US)

(73) Assignee: Shih-Jong J. Lee, Bellevue, WA (US)

(*) Notice: Subject to any disclaimer, the term of this patent is extended or adjusted under 35 U.S.C. 154(b) by 14 days.

(21) Appl. No.: 09/692,948

(22) Filed: Oct. 20, 2000

(51) Int. Cl.[7] .............. G06T 5/20; G06T 5/30; G06T 1/20
(52) U.S. Cl. ............ 382/260; 382/302; 382/308
(58) Field of Search ................. 382/260, 257, 382/302, 303, 307, 308

(56) References Cited

U.S. PATENT DOCUMENTS

| 4,809,348 A | * | 2/1989 | Meyer et al. | ............... 382/302 |
| 5,046,190 A | * | 9/1991 | Daniel et al. | ............... 382/303 |

* cited by examiner

*Primary Examiner*—Scott Rogers

(57) ABSTRACT

A high speed image processing apparatus is created through the use of cascaded elongated filters. The processing speed of the filters is kernel size insensitive, enabling use of general purpose computing facilities to process high resolution, monochrome, and multi-spectrum images. Elongated filters described include both linear and non-linear filters. Very large kernel and multi-dimensional image processing is accomplished with reduced complexity and portable programming instructions.

12 Claims, 11 Drawing Sheets

450

440

430

Fig 4D = Fig 4A ◆ Fig4B ◆ Fig4C
where ◆ means cascaded filter

Fig_7D = Fig_7A ◆ Fig_7B ◆ Fig_7C

- 9 multiplications
- 8 additions

HIGH SPEED IMAGE PROCESSING APPARATUS USING A CASCADE OF ELONGATED FILTERS PROGRAMMED IN A COMPUTER

U.S. PATENT REFERENCES

1. U.S. Pat. No. 5,315,700 entitled, "Method and Apparatus for Rapidly Processing Data Sequences", by Johnston et. al., May 24, 1994
2. U.S. Pat. No. 6,130,967 entitled, "Method and Apparatus for a Reduced Instruction Set Architecture for Multidimensional image processing", by Shih-Jong J. Lee, et. al., Oct. 10, 2000
3. Pending application Ser No. 08/888,116 entitled, "Method and Apparatus for Semiconductor Wafer and LCD Inspection Using Multidimensional Image Decomposition and Synthesis", by Shih-Jong J. Lee, et. al., filed Jul. 3, 1997
4. U.S. Pat. No. 6,122,397 entitled, "Method and Apparatus for Maskless Semiconductor and Liquid Crystal Display Inspection", by Shih-Jong J. Lee, et. al., Sep. 19, 2000
5. U.S. Pat. No. 6,148,099 entitled, "Method and Apparatus for Incremental Concurrent Learning in Automatic Semiconductor Wafer and Liquid Crystal Display Defect Classification", by Shih-Jong J. Lee et. al., filed Jul. 3, 1997

CO-PENDING PATENT APPLICATIONS

1. Co-Pending U.S. patent application Ser. No. 09/693,723 entitled, "Image Processing System with Enhanced Processing and Memory Management", Shih-Jong J. Lee et. al.
2. Co-pending U.S. patent application Ser. No. 09/693,378 entitled; "Image Processing Apparatus Using a Cascade of Poly-Point Operations, Shih-Jong J. Lee 1. Background—Field of the Invention This invention relates to image processing, specifically to an improved filtering approach.

2. Background of the Invention—Prior Art

Conventional image processing algorithms can be implemented in general purpose computers. However, the processing speed is not satisfactory for most time-critical computer vision applications. In today's art, specialized image processing hardware is used. In contrast to the general trend of general purpose hardware which is widely applied to general tasks and is therefore inexpensive, the specialized hardware used in image processing is costly to create and difficult to maintain and to update. The result is that the specialized hardware approach results in obsolete technology being used in current products. The modularized conventional image processing approach requires the use of several costly special hardware modules (video acquisition, processing, display, storage) and specialized development tools. Because of the cost and development effort required for each image processing application, the technology has been limited to high-end applications and products that can absorb the excessive cost. It is not practical for a large number of lower end application opportunities such as digital cameras, video capable web phones and vision capable information appliances.

Another difficulty is that even with specialized hardware and a large development time, large kernel or three-dimensional image processing operations are still prohibitively expensive or time consuming.

3. Objects and Advantages

It is an object of this invention to enable a new paradigm of high performance image processing systems using low-cost general purpose computing platform programmable in a high level language to accomplish high performance real time image processing. It is a further object of the invention to enable real-time image processing in resource constrained mobile computing or information/e appliance platforms. A further object of the invention is to enable real-time, high performance image processing capability for industrial, scientific and medical applications using low cost desktop computing facilities or embedded CPU. A further object of the invention is to allow the increase of image processing capability without significant work when speed/capacity of CPU and memory increases or multiple CPUs, memory channels become available for use. A further object is to increase the cross platform portability of the image processing software. Another object of the invention is to decrease sensitivity to kernel size in image processing operations and thereby facilitate efficient large kernel or multi-dimensional image processing at lower cost or higher throughput. Further objects and advantages of the invention will become apparent from a consideration of the drawings and ensuing description.

SUMMARY OF THE INVENTION

This invention provides apparatus for both linear and non-linear filtering of digitized images which are easy to implement and operate very efficiently, allowing the application of capable image processing software on computers having minimum specialized hardware or alternatively on more capable computers providing large kernel or multidimensional filters while maintaining high throughput. This increase in efficiency is accomplished by breaking down the larger task into a series of smaller related tasks with a particular optimization for the practical implementation of each task. Each of the smaller tasks is further architected to decrease the time spent computing a result by selecting the basic filter elements based on their computing requirements and a realistic view of the impact of finite sampling and pixel quantization of the input image.

DESCRIPTION OF THE PREFERRED AND ALTERNATE EMBODIMENTS

Figure 2:
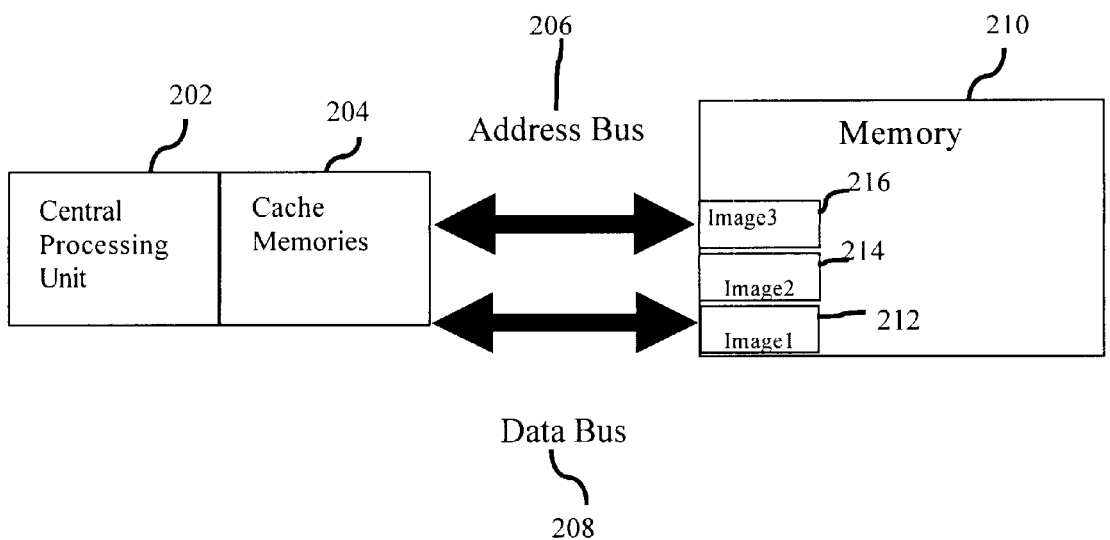
FIG. 2 Hardware architecture for elongated filter image processing.

The hardware architecture that supports image processing operations in this invention is shown in FIG. 2. This architecture exists on almost all computers. A computer has at least one Central Processing Unit (CPU) 202 and one memory module 210. Simple computers could have the CPU and memory on a single chip. More complicated computers may have multiple CPUs and multiple memory boards. This invention stores an image as a contiguous block in memory 212, 214, 216 or other convenient way for memory addressing. Multiple images can be efficiently stored and accessed. The interface between the CPU and the memory is through an address bus 206 and a data bus 208. Most CPUs have on-chip or external high-speed cache memories 204. The memory access can be under the control of CPU or through a Direct Memory Access (DMA) module.

Elongated Filter Operations

Images are efficiently accessed by sequentially incrementing the address corresponding to single or multiple memory locations. Elongated filter operations are performed in the CPU on data loaded from the memory addressed. The results of the operations are stored in either an internal buffer, cache memory or as an image in the memory. The elongated filter image operations can be carried out by the steps shown in FIG. 3, 300.

Figure 3:
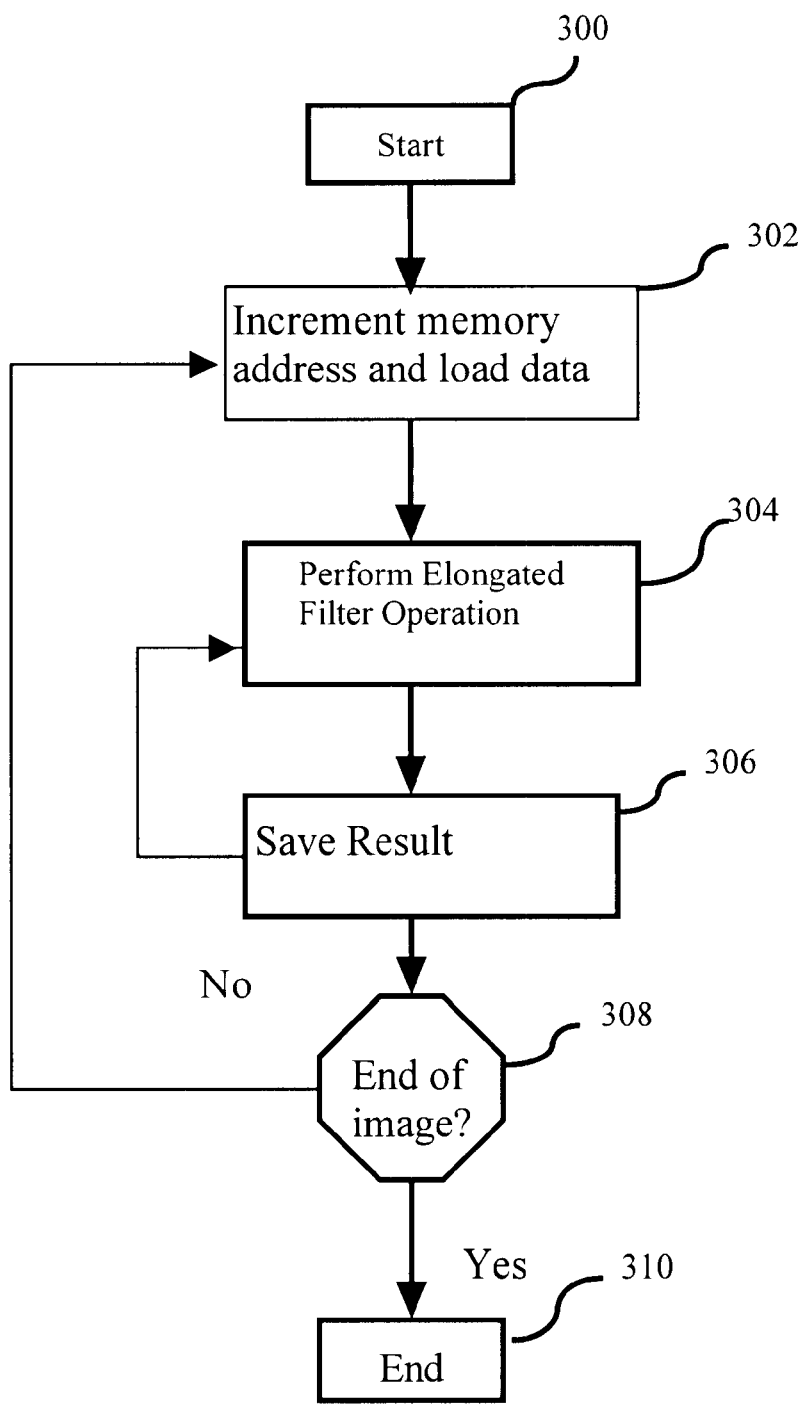
FIG. 3 shows the Steps of an elongated filter image operation.

As shown in FIG. 3, memory addresses are incremented sequentially 302 and data associated with the addressed memories are loaded into the CPU. The elongated filter operation is performed on the data 304 and the result of the operation is saved 306 to an internal buffer or memory. The operation result is also feedback to the CPU for performing the filter operation of the new data. A check is performed to determine whether the whole image is processed, 308. If the whole image is processed, the elongated filter image operation is completed 310. Otherwise, the memory addresses are incremented and the steps are repeated.

Many memory capacity, access and processing speed up features are built into general purpose CPUs. For example, the Intel® Pentium® III processor integrates the P6 Dynamic Execution micro-architecture, Dual Independent Bus (DIB) Architecture, a multi-transaction system bus, Intel® MMX™ media enhancement technology, and Internet Streaming SIMD Extensions. It also includes Advanced Transfer Cache and Advanced System Buffering to achieve higher data bandwidth. It has memory cache-ability up to 4 GB of addressable memory space and system memory scalability up to 64 GB of physical memory that allows the storage of a huge number of images. PowerPC 7400 uses Alti Vec technology vector processing units to speed the processing.

The elongated filter image operations in this invention are simple and rather predictable. The simplicity and predictability improves the efficiency of memory caching and operation predictions that are built into many CPUs. This invention uses a cascade of elongated filters to achieve high speed linear filtering and morphological operations which form the bases of most of the neighborhood based image processing functions.

Morphologic Filtering by Cascade of Elongated Filters

Figure 4A:
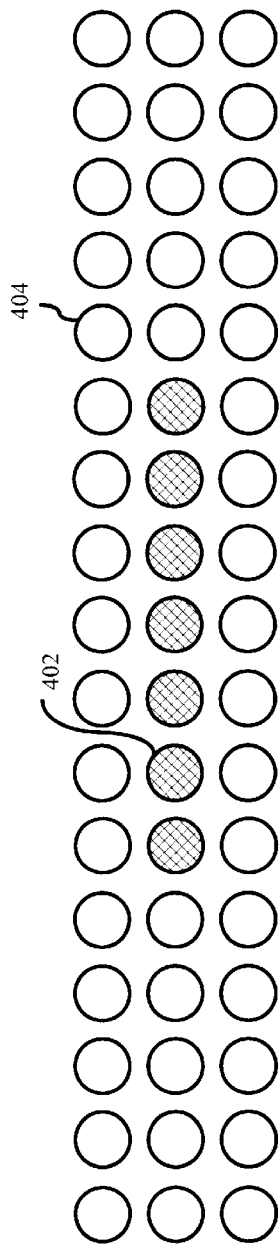
FIG. 4A shows a first elongated morphological filter.
Figure 4C:
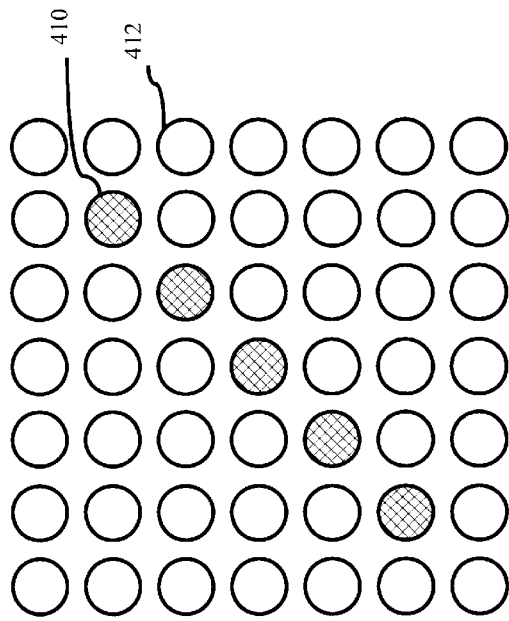
FIG. 4C shows a third diagonal elongated morphological filter.
Figure 4B:
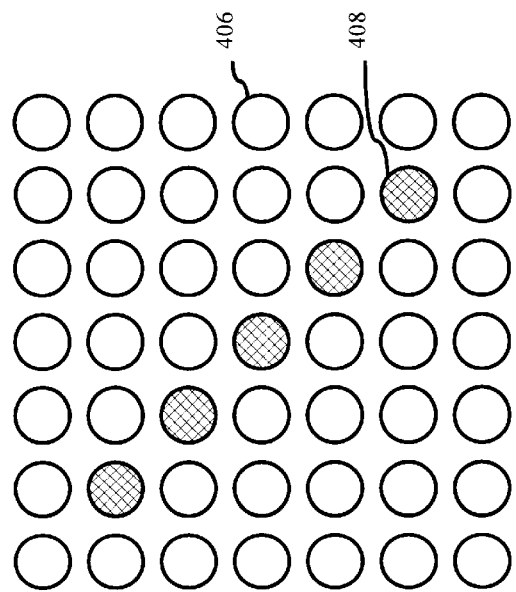
FIG. 4B shows a second diagonal elongated morphological filter.
Figure 4D:
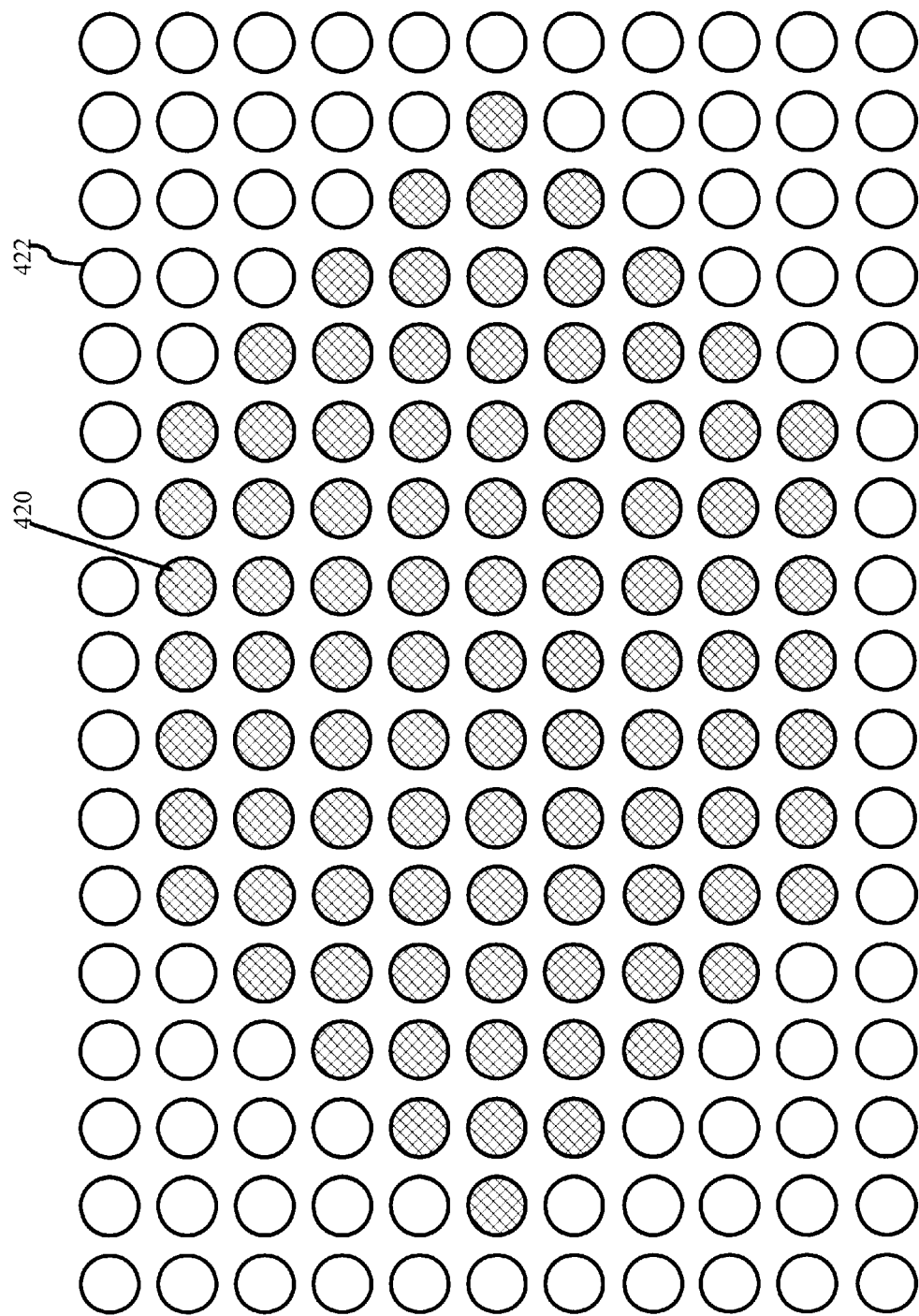
FIG. 4D shows A 95 point two dimensional grayscale dilation implemented as a cascade of three elongated morphological filters. The three elongated morphological filters are shown in FIGS. 4A, 4B, and 4C.
Figure 5:
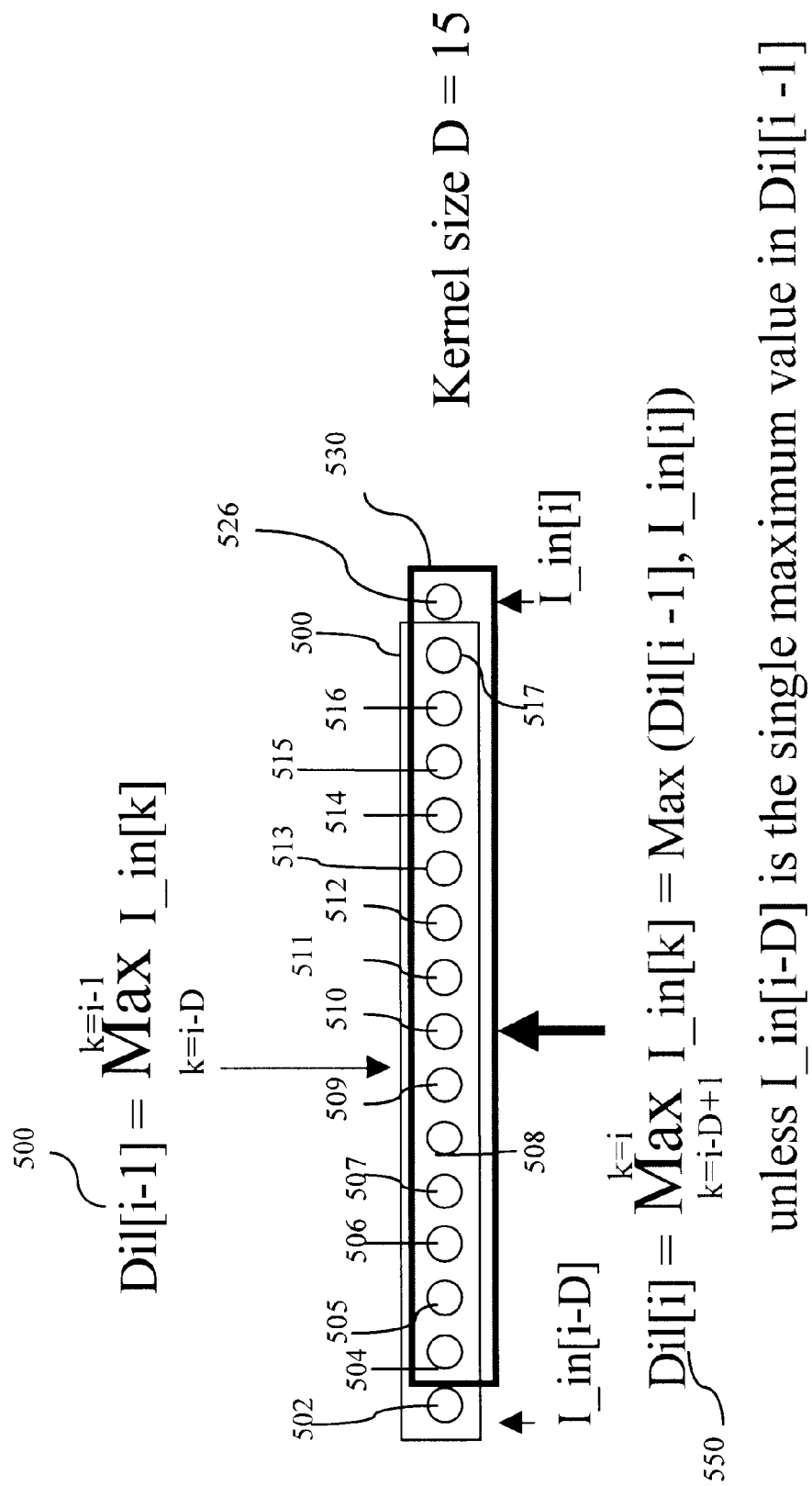
FIG. 5 illustrates the recursive relationship between Dil[i] and Dil[i−1] for an elongated grayscale morphological dilation of size 15.

Morphological filtering is conventionally achieved by neighborhood maximum or minimum operations. However, the conventional approach requires a lot of computing resource and memory access for large kernel operations. This invention can efficiently achieve the same operations by a simple program that performs a cascade of elongated filters. FIG. 4D shows a 95 point two dimensional grayscale dilation 435 implemented as a cascade of three elongated morphological filters 450, 430, 440 of different directions shown in FIGS. 4A, 4B, and 4C. Each elongated filter has a kernel of elements 402, 408, 410 organized in a repeated arrangement along an axis (horizontal 450, descending diagonal 430, ascending diagonal 440). Such a filter organization can be efficiently operated upon from memory using the technology disclosed in a co-pending application titled "Image Processing System with Enhanced Memory Management" (co-pending application 1). The elongated filters can be efficiently programmed as a recursive operation that derives the result of the current pixel from the result of the previous pixel. FIG. 5 shows the recursive relationship of an elongated grayscale morphological dilation, DIL, of size D=15, 500.

An elongated grayscale morphological dilation of size D performs the following operation to an input image I_in 550:

$$Dil[i] = \max_{k=i-D+1}^{k=i} I\_in[k].$$

Since $$Dil[i-1] = \max_{k=i-D}^{k=i-1} I\_in[k] 500,$$

a recursive relationship can be established between Dil[i] and Dil[i−1] as follows: Dil[i]=Max (Dil[i−1], I_in[i]) unless I_in[i−D] is the single maximum value in Dil[i−1]. In this case, a determination of the maximum between I_in[i−D+1] and I_in[i] involves the comparison of all D values.

The above recursive relationship can be efficiently programmed using only one comparison as follows: Dil[++i]= Max (Dil[i−1], I_in[i]) for a single width elongated dilation of structuring element size D.

The simple addressing mode of image memory (ref: co-pending U.S. patent application reference 1) allows efficient use of pre-fetch and cache-ability instructions provided by the CPU. For example, a substantial portion of the input image could be loaded into the cache memory to facilitate high speed processing.

The exceptional condition where I_in[i−D] 502 is the single maximum value in Dil[i−1] 500 can be handled by a simple maximum indexing scheme. A maximum index is set to D−1 when the new input I_in[i] 526 has the maximum value. If the new input I_in[i] 526 does not have the maximum value and the maximum index is non-zero, the maximum index is decremented by 1. The maximum index becomes zero when I_in[i−D] 502 is the single maximum value of Dil[i−1]. In this case, the maximum value for Dil[i]

has to be re-determined from the input data I_in[i−D+1] through I_in[i−1] 504, 505, 506, 507, 508, 509, 510, 511, 512, 513, 514, 515, 516, 517.

In one embodiment of the invention, the operations in FIG. 5 can be programmed in pseudo code as follows:

```
#Define D_size 15;
#Define D_minus_1 14;
char I_in[image_size], Dil[image_size];
register int i, j, Max_index;
Max_index=FINDmax(I_in, −1, D_size, Dil[D_minus_1]);
For (i=D_size, j=0; i<image_size; i++, j++)
{
If (I_in[i]>=Dil[i−1])
{
   Dil[i]=I_in[i];
   Max_index=D_minus_1;
}
Else if (Max_index)
{
   Dil[i]=Dil[i−1];
   Max_index−;
}
Else
   Max_index=FINDmax(I_in, j, D_minus_1, &Dil[i]);
```

In this implementation, image memories are declared as arrays in a software program. Registers are used for the address pointer and maximum index to increase the access speed. "image_size" is the size of the image being processed. The program is very simple and straightforward so it can be easily optimized or written in C/C++, Java, assembly language or other computer languages for the best performance. Additional programs may be written to handle image boundary conditions. This can be done by extending each line of an image to include desired data for handling boundary conditions or by performing the above operations one line at a time and handling the boundary condition for each line.

The FINDmax( ) function finds the maximum value from an array between starting_index+1 to starting_index+size and stores the maximum value to the content of a memory address and returns the index corresponding to the maximum value minus 1.

```
int FINDmax(array, starting_index, size, max_output)
char array[ ];
int starting_index, size;
char *max_output;
{
int Max_index=1;
*max_output=array[starting_index+1];
for (i=2; i<=size; i++)
55
   if (array[starting_index+i]>=*max_output)
   {
      *max_output=array[starting_index+i];
      Max_index=i;
   }
}
Return (Max_index−1);
}
```

Note that the processing speed is structuring element size insensitive. It requires only one maximal operation and an index update on each pixel. It requires the finding of maximum value only when the exception condition occurs. The occurrence of the exceptional condition depends on the nature of the data as well as the structuring element size. The exceptional condition is less likely to occur when the structuring element size is large. In most cases, the computational saving will be substantial for a reasonable size structuring element. Even though the speed of the elongated filter is not completely structuring element size independent, it is structuring element size insensitive. The throughput gain is greater for larger structuring element size.

Those skilled in the art should notice that by changing the above operations from maximum to minimum, an elongated morphological erosion can be achieved with identical method.

Figure 6:
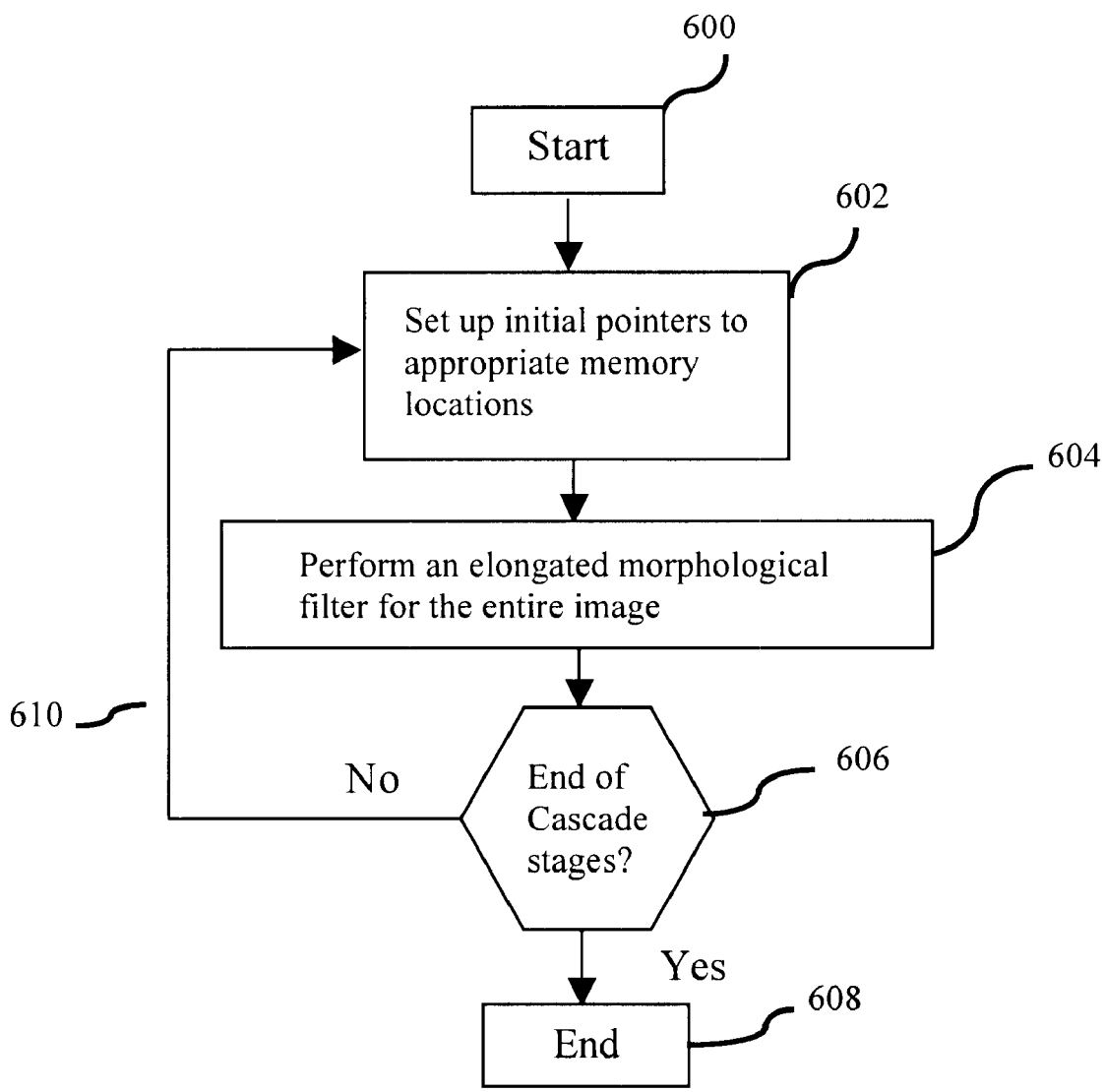
FIG. 6 shows steps for performing a cascade of the elongated morphological filter operations.

Two dimensional or higher dimensional morphological filters can be efficiently implemented as a cascade of elongated morphological filters as shown in FIGS. 4A, 4B, 4C, 4D. The steps for performing a cascade of elongated morphological filters are shown in FIG. 6. Memory address pointers are setup according to the size and direction of the structuring element for elongated morphological filters 602. Each elongated morphological filter is performed for the entire image 600. For memories that are most efficient when accessed sequentially, memory management invention disclosed in co-pending patent application reference 1 can be used to pre-arrange the memory in a most efficient fashion to support directional elongated morphological filters. A check 606 is performed to determine whether all stages in the image filtering cascade are completed. If all stages are completed, the image filtering function is completed 606. Otherwise, the memory address pointers are setup and the steps are repeated.

Linear Filtering by Cascade of Elongated Flat Filter

Figure 7A:
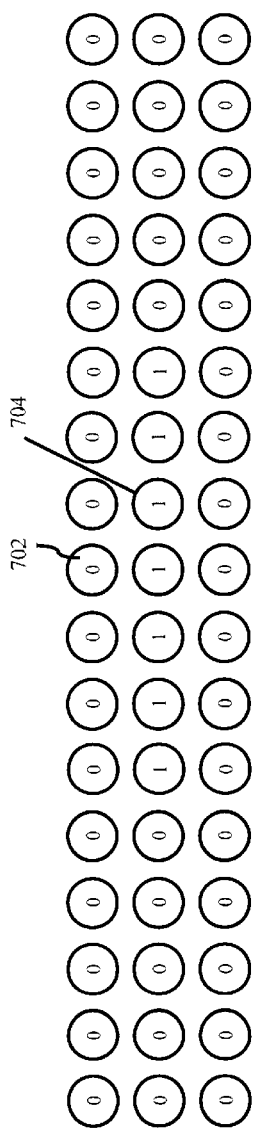
FIG. 7A shows a first elongated linear filter used in an example construction for a large kernel 95 point two dimensional linear filter.
Figure 7C:
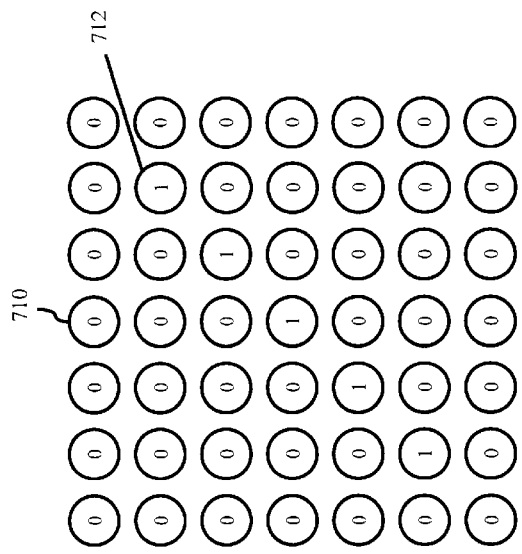
FIG. 7C shows a third elongated linear filter used in an example construction for a large kernel 95 point two dimensional linear filter.
Figure 7B:
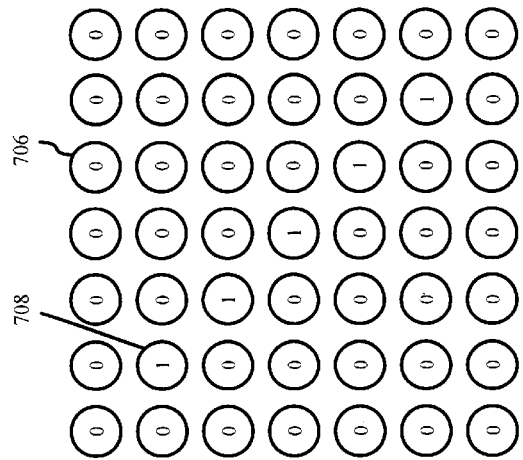
FIG. 7B shows a second elongated linear filter used in an example construction for a large kernel 95 point two dimensional linear filter.
Figure 7D:
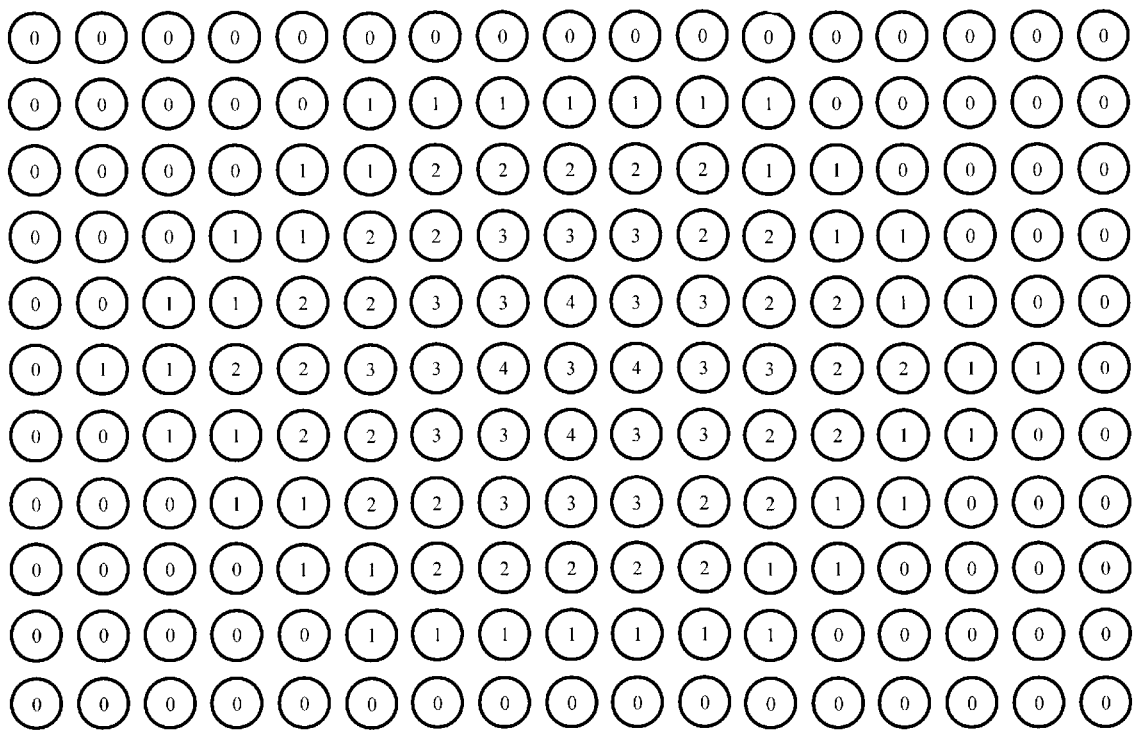
FIG. 7D shows A 95 point two dimensional linear filter implemented as a cascade of three elongated flat filters shown in FIGS. 7A, 7B, and 7C.
Figure 9:
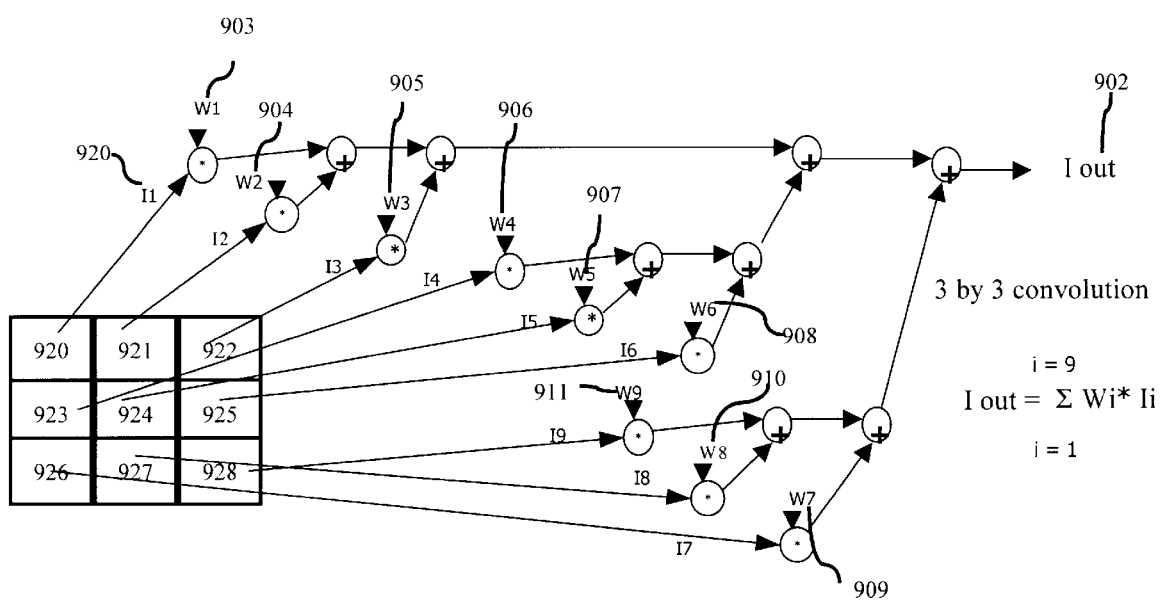
FIG. 9 shows the prior art steps for performing a convolution with a 9 element kernel and an input image to produce an output image.

Linear filtering is conventionally achieved by neighborhood weighted sum operations as shown in FIG. 9. The FIG. 9 example shows a 3 by 3 kernel convolution operation wherein a single output pixel value 902 is the weighted sum of the 9 pixel elements 920–928. The weights 903–911 are taken from a 3 by 3 element kernel that describes the filter impulse response. In the general case, these weights are floating point numbers, so computing a single pixel's output result 902 involves 9 floating point multiplications and 8 floating point additions. This is a substantial amount of multiplication, which is a time consuming (or hardware intensive) computing requirement. If the kernel is larger than 9 elements, the computational task expands geometrically. In addition, for every output pixel value computed, many pixel values have to be accessed in memory (9 in this case). This example involves a relatively small size kernel, but there is a need for much larger kernels. The need for large kernel sizes increases with image resolution or color spectrum. This invention can efficiently achieve the same (or usefully equivalent) filtering operations by a simple program that performs a cascade of elongated flat filters instead of a single large filter operation. A cascade of filters is one filtering operation on an image creating a first filtering result, followed by a second filtering operation on the first filtered result to create a second filtered result, followed by a third filtering operation if necessary on the second filtering result and so forth. The order of filtering is not important unless there is a mixture of non-linear operators. For example, a cascade of dilation operations or a cascade of erosion operations (dilation and erosion are non-linear operators) can occur in any order, but mixing of dilation and erosion operations in different orders will change the result. In the explanation below, the ◆ symbol is used to indicate the cascade of filters. The effect of the ◆ symbol is to invoke numerical convolution, however, the terms of the kernel selected have been specially chosen to make the performance of that convolution nearly trivial. The complexity is reduced by selection of filter coefficients to be all equal value, usually 1, to minimize scaling and because multiplication by 1 produces the input result and therefore only addition is required to accomplish the convolved (filtered) result. Of course, the filtering operation is also reduced into relatively small kernel sizes. This reduces the number of pixels that must be accessed from memory to compute any intermediate result, yet because of the cascading principle, effectively construct very large kernel filter results. Scaling can be facilitated by selection of flat filter values so that the sum of the elements results in a total division value which is implementable by bit manipulation. For example, a binary shift right 4 places is equivalent to divide by 16. A division operation for more general division values can be accomplished using the look-up table invention disclosed in co-pending patent application reference 1. Outside the kernel, the filter coefficients are zero, which effectively bounds the number of pixels that need to be retrieved from memory to compute the output pixel result. This compounding simplicity is a large part of the reason the computation speed increases. The essence of the argument for an elongated filter problem solution is that it is the shape of the kernel that produces the filtered result more than the magnitude of the kernel elements so the filter kernel magnitudes can be influenced by efficiency of computation. Further, where sampling and quantization effects are substantial, the exact shape of the filter is not as important as the fact that it has an essential characteristic (e.g. low pass or band pass). For example, the effect of a carefully constructed Gaussian filter (using high precision floating point samples in the kernel) may be indistinguishable or at least not significant in a practical system from the general low pass filter that is accomplished at considerably lesser complexity in the examples contained herein. FIG. 7D shows a 95 point two dimensional linear filter implemented as a cascade of three elongated flat filters of different directions shown in FIGS. 7A, 7B, and 7C. In this example the three individual filters are themselves quintessentially simple, being simple flat filters with carefully chosen orientation. Different orientations and different basic kernel lengths can produce a family of different output results, each of which would have differing basic characteristics such as their low pass cut-off frequency or multi-dimensional frequency response. In this particular example, the cascaded result is a large kernel smooth filter having useful characteristics for low pass filtering with reasonable transient response. A co-pending patent application "Image Processing Apparatus Using Cascade of Poly-Point Operations" (co-pending patent application reference 2) shows how this fundamental principle can be expanded from flat elongated filters to poly-point kernels.

Figure 8:
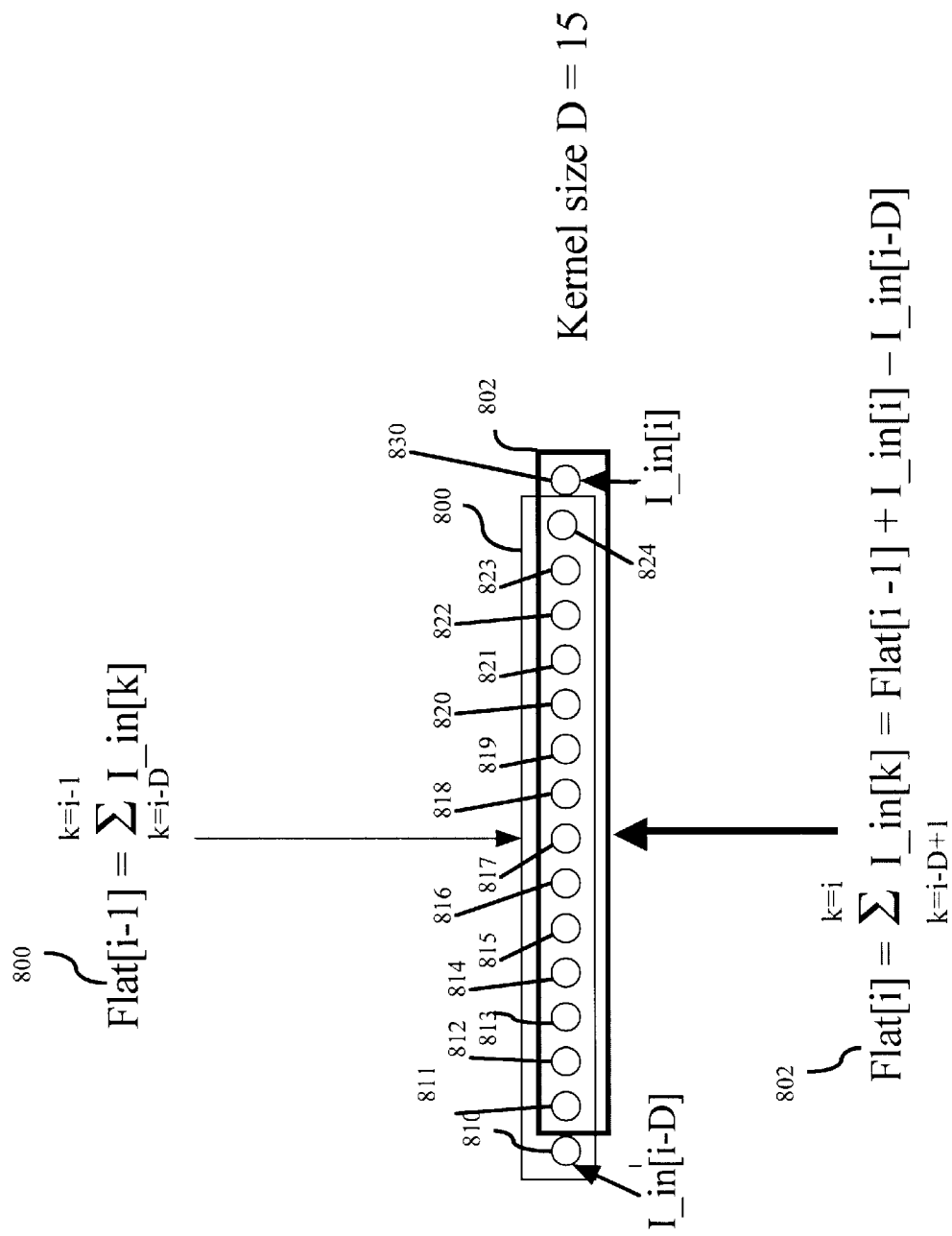
FIG. 8 illustrates the recursive relationship between Flat [i] and Flat[i−1] for an elongated flat linear filter of size 15.

Similarly to the elongated morphological filters, elongated flat filters can be efficiently programmed as a recursive operation that derives the result of the current pixel from the result of the previous pixel. FIG. 8 shows the recursive relationship of an elongated flat filter, Flat, of size D=15 wherein the value of Flat[i–1] 800 assists in the rapid determination of Flat[i] 802.

Recall that the weighting values are all equal value, preferably 1. Therefore, an elongated flat filter performs the following operation to an input image I_in:

$$\text{Flat}[i] = \sum_{k=i-D+1}^{k=i} I\_in[k]$$

Since $$\text{Flat}[i-1] = \sum_{k=i-D}^{k=i-1} I\_in[k],$$

a recursive relationship can be established between Flat[i] and Flat[i–1] as follows:

Flat[$i$]=Flat[$i$-1]+$I\_$in[$i$]-$I\_$in[$i$-$D$]

The above recursive relationship can be efficiently programmed using only one addition and one subtraction as follows:

Flat[$i$]=Dil[$i$-1]+$I\_$in[$i$]-$I\_$in[$(i$++$)$-$D$]

for a single width elongated structuring element of size D. This beautiful simplification follows from the choice of particular size kernel elements (one or zero) and from the flat nature (equal size elements) of the kernel. Some deviation from this ultimate simplification can be used and still retain the essential advantages of the invention. For example, some elements of the filter might be a different value, say 2 (integer) or even 1.3 (floating point). If the filter is not strictly flat, but can be broken down into components which are flat, it may be possible to achieve computational advantage by computing sub blocks of the filter separately using the principles related herein and then combining the result into a single filter result. By combining the results of the two flat filters, a computationally advantaged result may be achieved. Such advantage will likely increase as the length of the kernel increases. In a preferred embodiment, the unit kernel flat filter is optimum for maximizing computing speed.

The simple addressing mode of image memory allows efficient use of prefetch and cache-ability instructions provided by the CPU. For example, a substantial portion of the input image could be loaded in the cache memory to facilitate high speed processing.

In one embodiment of the invention, the operations as shown in FIG. 8 can be programmed in pseudo code as follows:

```
#Define D_size 15;
short Flat[image_size];
char I_in[image_size], I_out[image_size];
char Divide_by_D_LUT[Dimension_of_12bits]
register int i, j;
Flat[0]=I_in[0];
For (i=1; i<D_size; i++)
{
Flat[i]=Flat[i-1]+I_in[i];
I_out [i]=Divide_by_D_LUT[Flat[i]];
}
For (i=D_size; i<image_size; i++)
{
    Flat[i]=Flat[i-1]+I_in[i]-I_in[i-D];
    I_out[i]=Divide_by_D_LUT[Flat[i]];
}
```

In this implementation, image memories are declared as arrays in a software program. Registers are used for the address pointer to increase the access speed. "image_size" is the size of the image. Note that "short" data type (16 bits) is used for the image memory to allow for sufficient precision for the results of summation. If the filter elements are unit value, then to normalize the result to 8 bits for storage, the Flat filter result is divided by the kernel size D. This can be accomplished by a 12 bits to 8 bits look up table that stores the 8 bit results for all possible 12 bit data divided by D=15. An example of Look Up Table utility for computing filter results is given in co-pending patent application, "Image Processing System with Enhanced Memory Management" (co-pending patent application reference 1).

The program is very simple and straightforward so it can be easily optimized or written in C/C++, Java, assembly language or other computer languages for the best performance. Additional programs may be written to handle image boundary conditions. Boundary condition handling can be done by extending each line of an image to include desired data or by performing the above operations one line at a time and handling the boundary condition for each line according to a programmed method.

Note that the processing speed is kernel size independent. It requires only one addition and one subtraction for each pixel. Therefore, the achievable gain is greater for larger kernel or multi-dimensional filters than it is for short or one-dimensional kernels.

Figure 1:
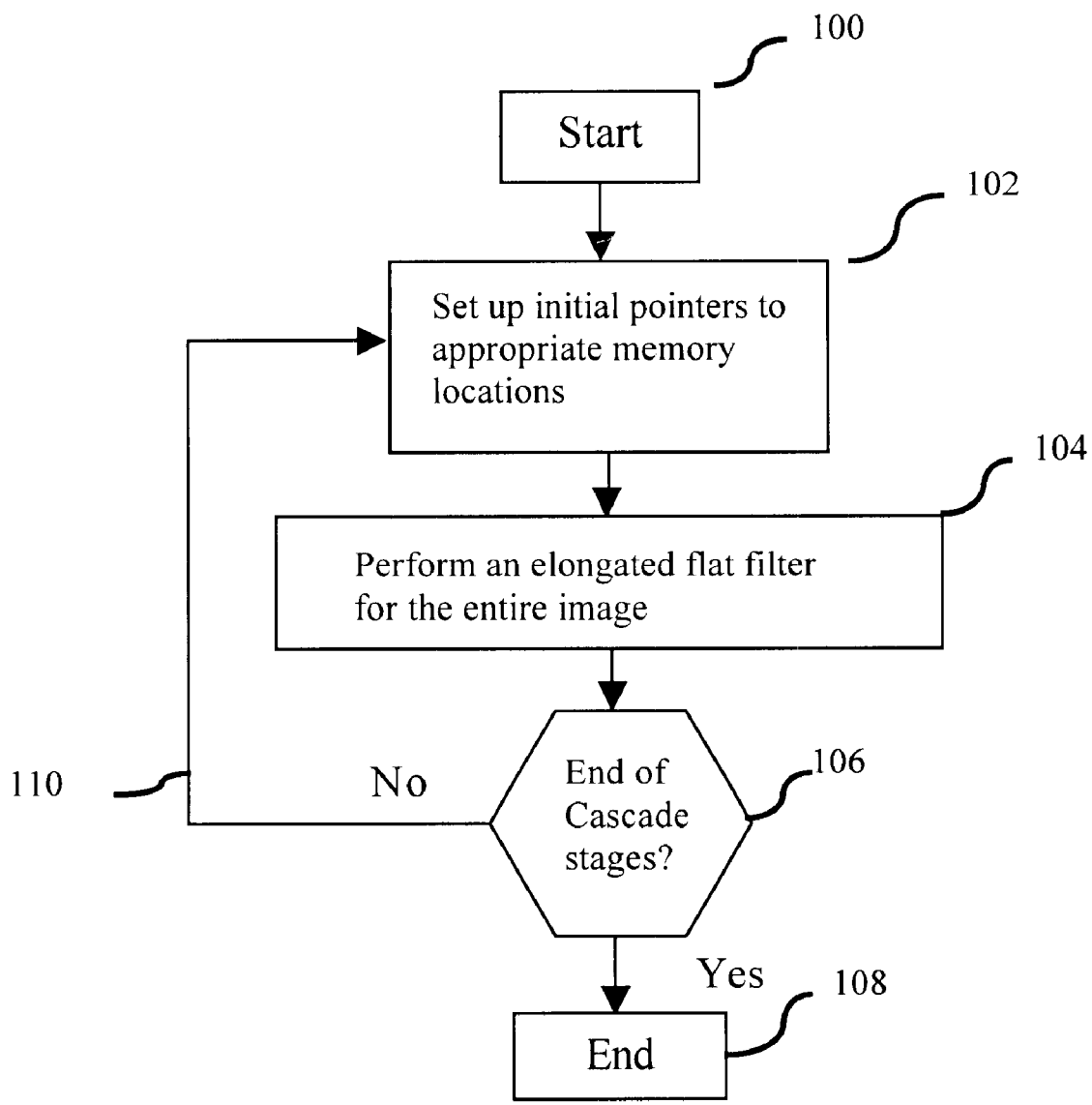
FIG. 1 shows the steps for performing a cascade of elongated flat filter operations.

Two dimensional or higher dimensional linear filters can be efficiently implemented as a cascade of elongated flat filters as shown in FIG. 7. The steps for performing a cascade of elongated flat filters are shown in FIG. 1. Memory address pointers are setup according to the size and direction of the kernel for elongated flat filters 102. Each elongated flat filter is performed for the entire image 104. For memories that are most efficient when accessed sequentially, memory management invention disclosed in co-pending patent application entitled, "Image Processing System with Enhanced Memory Management" (co-pending patent application reference 1) can be used to arrange the memory in the most efficient fashion to support directional elongated flat filters. A check 106 is performed to determine whether all stages in the image filtering cascade are completed. If all stages are completed 106, the image filtering function is completed 108. Otherwise, the memory address pointers are setup and the steps are repeated 110.

When implementing the cascade of elongated flat filters, the normalization (division operation) can be done at the last stage of the operation. This should yield better precision and is more efficient. The value to be divided is a product of the kernel size of each stage. The division value for the FIG. 7 example is D1*D2*D3=7*5*5=175. To implement the division in look up table for 8-bit images, a 16-bit by 8-bit look up table will be required.

The summation of the above operation can be changed to subtraction by using coefficients of −1 instead of +1. A cascade of elongated flat addition and elongated flat subtraction operations could achieve LaPlacian like functions using an approach as described for poly-point operators in co-pending patent application entitled, "Image Processing Apparatus Using Cascade of Poly-Point Operations", FIGS. 8 and 9. (co-pending patent application reference 2). Elongated filters include flat filters of varying lengths and orientations whose orientation can be described by structured memory mapping. In an embodiment, structured memory mapping includes mapped images that have been reorganized for simple circular scanning. In this instance, both row and column addresses would be offset simultaneously for processing direction. Such memory reorganization is described in co-pending patent application specified as reference 1.

The following patent applications are incorporated by reference hereto:
1. Co-Pending U.S. patent application Ser. No. 09/693,723 filed on the same date as this application entitled "Image Processing System with Enhanced Processing and Memory Management", by Shih-Jong James Lee et. al.

2. Co-Pending U.S. patent application Ser. No. 09/693,378 filed on the same date as this application entitled "Image Processing Apparatus Using a Cascade of Poly-Point Operations" by Shih-Jong James Lee The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A high speed image processing apparatus comprising:
   a. a central processing unit having a data bus and an address bus to access and load data;
   b. a memory to store images, wherein the memory is connected to the central processing unit through the data bus and the address bus;
   c. a program to direct the central processing unit to perform at least one elongated filter operation on image data loaded from the memory through the data bus and the address bus wherein
   d. the elongated filter operation speed is structuring element size insensitive.

2. The apparatus of claim 1 further comprising a program to perform a cascade of elongated filter operations comprising the means for
   a. initializing memory address pointers according to the size and direction of the kernels for a plurality of elongated filter operations;
   b. performing a plurality of elongated filter operations sequentially;
   c. checking to determine whether all stages in the image filtering cascade are completed.

3. A high speed image processing apparatus comprising:
   a. a central processing unit having a data bus and an address bus to access and load data;
   b. a memory to store images, wherein the memory is connected to the central processing unit through the data bus and the address bus;
   c. a program to direct the central processing unit to perform at least one elongated filter operation on image data loaded from the memory through the data bus and the address bus wherein the elongated filter operation comprises the steps of
      i. incrementing at least one image memory address sequentially and
      ii. loading data associated with the addressed memory into a CPU;
      iii. performing at least one elongated filter operation on new image data to obtain an output where the elongated filter operation is selected from the set consisting of a flat filter, or a plurality of flat elongated filter operations with a combined result output;
      iv. saving the output of the elongated filter operation to memory;
      v. checking whether the image has completed processing.

4. The apparatus of claim 3 wherein the flat filter operation is an addition filter.

5. The apparatus of claim 3 wherein the flat filter operation includes a subtraction filter.

6. An elongated filter method for linear filtering comprising the following steps:
   a. acquire a plurality of image pixels organized sequentially to produce an image data input. I_in;
   b. set kernel size, D;
   c. perform an initial value calculation according to the following relationship $$\text{Flat}[i] = \sum_{k=i-D+1}^{k=i} I\_in[k];$$

d. determine subsequent filter outputs according to the relationship $$\text{Flat}[i]=\text{Flat}[i-1]+I\_in[i]-I\_in[i-D].$$

7. The method of claim 6 further comprising a step to handle image boundary conditions.

8. The method of claim 6 further comprising a cascade of elongated for two dimensional or higher dimensional linear filtering.

9. An elongated filter method for morphological erosion filtering comprising the following steps:
   e. acquire a plurality of image pixels organized sequentially to produce an image data input, I_in;
   f. set kernel size, D;
   g. perform an initial value calculation according to the following relationship $$\text{Erosion}[i] = \min_{k=i-D+1}^{k=i} I\_in[k]$$

h. if I_in[i−D] is the single minimum value in Erosion[i−1], determine the minimum of I_in[k] for k between i−D+1 and i;
   i. When I_in[i−D] is not the single minimum value in Erosion[i−1], determine subsequent erosion outputs according to the relationship $$\text{Erosion}[i]=\text{Min}(\text{Erosion}[i-1], I\_in[i]).$$

10. The method of claim 9 further comprising a cascade of elongated filters for two dimensional or higher dimensional filtering.

11. An elongated filter method for morphological dilation filtering comprising the following steps:
   a. acquire a plurality of image pixels organized sequentially to produce an image data input, I_in;
   b. set kernel size, D;
   c. perform an initial value calculation according to the following relationship $$\text{Dil}[i] = \max_{k=i-D+1}^{k=i} I\_in[k];$$

d. if I_in[i−D] is the single maximum value in Dil[i−1], determine the maximum of I_in[k] for k between i−D+1 and i;
   e. when I_in[i−D] is not the single maximum value in Dil[i−1], determine subsequent dilation outputs according to the relationship $$\text{Dil}[i]=\text{Max}(\text{Dil}[i-1], I\_in[i]).$$

12. The method of claim 11 further comprising a cascade of elongated filters for two dimensional or higher dimensional filtering.

* * * * *